Dec. 14, 1965  TAKUMA YAMAMOTO ET AL  3,223,783
TIME-DIVISION MULTIPLEX VOICE-FREQUENCY DISCRIMINATOR
Filed May 8, 1961  11 Sheets-Sheet 1

United States Patent Office 3,223,783
Patented Dec. 14, 1965

3,223,783
TIME-DIVISION MULTIPLEX VOICE-FREQUENCY DISCRIMINATOR
Takuma Yamamoto, Tokyo, and Toshihiko Nakamura and Ryosaku Shimada, Kawasaki-shi, Japan, assignors to Fuji Tsushinki Seizo Kabushiki Kaisha, Kawasaki, Japan, a corporation of Japan
Filed May 8, 1961, Ser. No. 108,426
Claims priority, application Japan, May 9, 1960, 35/23,850
5 Claims. (Cl. 179—15)

Our invention relates to time-division multiplex transmission systems, more particularly to a discriminator for sampled voice-frequency signals in such systems, and has for its main objects to simplify the over-all multiplex system and to improve its reliability, for example in telephone-exchange systems with tone-frequency dialing or ringing, where a discrimination between the respective time-division channels of different subscribers or other stations is desired for registering purposes.

Figure 1:
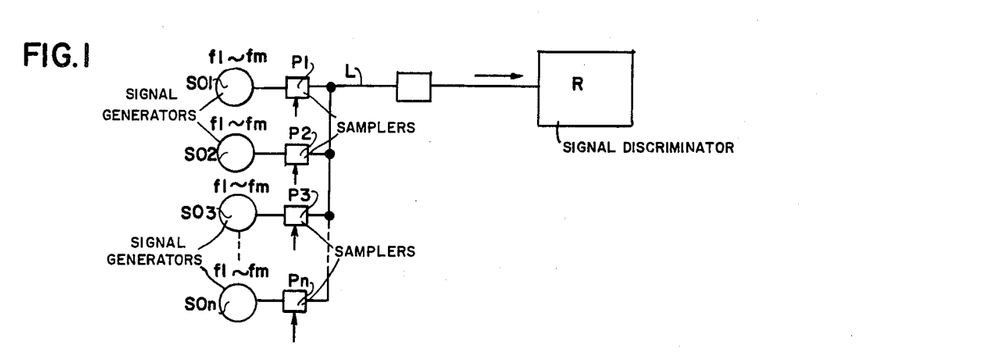
FIG. 1 is an explanatory system diagram already described above.

A discriminator in a T.D.M. system usually operates in a network as shown schematically in FIG. 1 of the accompanying drawing. SO1, SO2, ... SO$n$ represent a number of voice-frequency signal generators, each being capable of oscillating at freely selected frequencies $fl$ to $fm$. Voice-frequency signals from these generators are sent through a common transmission line L after they are applied to sampling devices P1, P2, ... P$n$ and multiplexed on the time-division principle. A signal discriminator R receives the sampled signals and serves to recognize the particular signal generators to which they belong as well as their respective frequencies.

Figure 2:
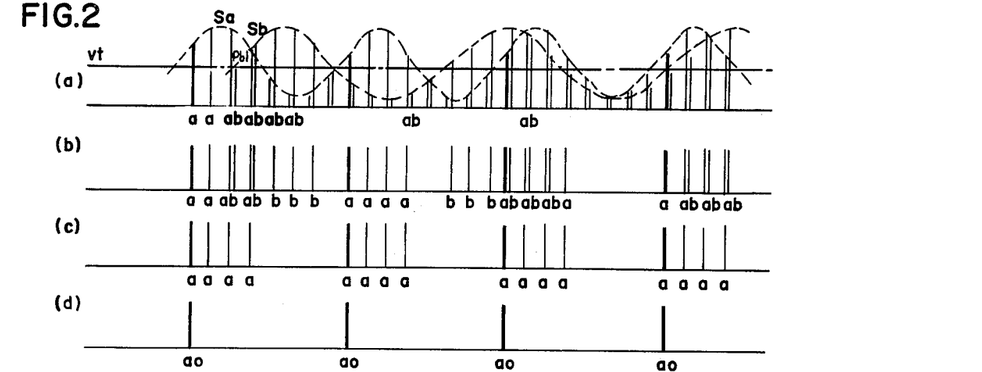
FIGS. 2(a) to 2(d), of which FIG. 2(a) has been described above, are voltage versus time graphs explanatory of the principles of the invention.

An instance of such discriminating performance is illustrated in FIG. 2($a$). Assuming that the signal generators SO1 and SO2 shown in the figure are simultaneously oscillating at respective voice frequencies $f1$ and $f3$, the signal from SO1 is converted by the sampling device P1 into a signal S$a$ comprising sampling pulses $a$, and the signal from SO2 is converted in device P2 into a signal S$b$ comprising pulses $b$. Then the signals S$a$ and S$b$ are multiplexed on the time division system in the manner illustrated and are sent to the signal discriminator R via a common transmission line. The discriminator R, receiving these two signals, recognizes that SO1 and SO2 are oscillating at frequencies $f1$ and $f2$, respectively.

In the case of a T.D.M. telephone exchange system, the subscriber or station sets correspond to the voice-frequency signal generators (SO1 ... SO$n$ in FIG. 1), while registers are provided to function as signal discriminators (R). Each station set is provided with 10 oscillators corresponding to frequencies $f1$ to $f10$. The selection of these frequencies is carried out by means of pushbuttons (not shown) substituting for a number dial. That is to say, when a pushbutton 1 is pressed, the corresponding oscillator is actuated and generates a signal with the frequency $f1$, while when a pushbutton 2 is pressed, a signal with the frequency $f2$ is generated, and so forth. Accordingly, for transmitting the number 1246 from the station set SO1, the pushbuttons 1, 2, 4 and 6 of this set are to be pressed successively, whereby signals of the respective frequencies $f1$, $f2$, $f4$ and $f6$ are in turn oscillated and sent out into the common transmission line after having been turned into sampled signals by the sampling device corresponding to the set. If, at the same time, the number 4258 is to be transmitted from another station set, e.g. SO2, the pushbuttons 4, 2, 5 and 8 of this latter set are pressed successively, with the result that signals with the respective frequencies $f4$, $f2$, $f5$ and $f8$ are generated, sampled and sent out into the common transmission line. The sampled signals on the common transmission line are received by the register R which serves as a signal discriminator and which identifies the number 1246 transmitted from station SO1 as well as the number 4256 from station SO2 by picking up the frequencies $f1$, $f2$, $f4$ and $f6$ for the former and $f4$, $f2$, $f5$, and $f8$ for the latter station.

According to a known method of discriminating sampled voice-frequency signals, the incoming signals are first applied to demodulators and then discriminated from one another by passing through differently tuned filters. A deficiency of this method is that each channel requires an independent demodulator and filter, because the incoming signals are multiplexed on the time division system. Thus the number of demodulators and filters as a whole is considerable, adding a great deal to the cost of the equipment.

As a means of eliminating such drawback, an experimental system has been offered, wherein each channel is provided with a simple detector designed to recognize the presence or absence of incoming signals through the channel and to effect a temporary connection of the channel with a small number of discriminating circuits comprising filters when incoming signals are recognized as being present in the particular channel. United States Patent No. 2,876,284 describes an example of this system. It has the advantage that it does not require a large number of discriminating circuits involving filters, but still requires providing each channel with an independent demodulator and filter. In addition, a special means must be devised to carry out a temporary connection between each channel and the discriminating circuits.

The voice-frequency or sonic-frequency discriminator according to our invention functions on a different principle. Sampled signals are first examined to decide whether they exceed a certain threshold level, and are then converted into digital signals, whereby a frequency discrimination is carried out in digital terms. The signal discriminator is common to all channels on the T.D.M. transmission system. Hence, it is unnecessary to provide a number of discriminators. The discriminator also operates on the time division system, in order to receive sampled signals transmitted through all the channels. The discriminator is composed of three parts, namely a threshold discriminating means, a pulse extracting means and a counting means. The threshold means performs the function of deciding whether or not incoming sampled signals exceed a threshold level. The second extracting means extracts one particular pulse from a sampled signal every time the signal exceeds the threshold level. The counting means computes the interval between two or a number of successive pulses thus extracted or their recurrence rate within a fixed time.

The discrimination of signals is based on the following principle. Providing that all the channels share a common signal discriminator operated on the time division system, it is justifiable to take into consideration a single case where sample pulses (e.g. pulses $a$ in FIG. 1) exist in an incoming signal transmitted through one channel. Hence, all that is required for recognizing the signal is to measure its frequency. This is feasible by first examining the signal to see if it exceeds a certain threshold level and then picking up exclusively those sampled pulses included in the sections of the signal that exceed the threshold level. If the sampled pulses thus picked up are logically differentiated, it is possible to extract a particular pulse from each of the said sections. Since the interval of such particular pulses approximately equals one cycle of the sampled signal, it follows that the frequency of the sampled signal can be determined by measuring the pulse interval or counting the recurrence rate of the particular pulses within a fixed time. To operate the signal discriminator on the time division system and thereby enable frequency measurements to be carried out with respect to all the channels, memory devices are provided in the discriminator to memorize the information of all channels.

One important factor to be taken into consideration is how to prevent the signal discriminator from error operation caused by noise or other alien signals. With our invention, the possibilities of such error operation can be greatly diminished by preparing two kinds of threshold discriminating means, the threshold level for the first discriminating means being set higher than that of the second. The first means plays the part of determining whether a sampled signal exceeds its threshold level, whereby it brings the whole discriminating network into stand-by order, and after that pulse extractions are carried out in terms of the threshold level for the second means. This will serve the purpose of distinguishing voice-frequency signals from most noise signals. Generally speaking, discriminating errors due to noises are more liable to occur in our system than in the traditional method of analyzing the frequency spectrum of sampled signals by means of filters. However, such errors can be practically eliminated by setting the level of sampled signals sufficiently high and by making their waveform similar to square waves to a possible extent. Moreover, the system according to the invention is provided with a special means to ensure satisfactory signal discrimination against the interference caused by small values of noise signals.

When the present invention is applied to the telephone exchange system, each station set or trunk line plays the part of a signal generator, while the signal discriminator serves as a register. Connections between each signal generator and the register are carried out, as known to the public, by means of T.D.M. switches and their control mechanism. If employed in a telephone exchange system involving voice-frequency dialing, the invention will greatly help to simplify the system.

The above-mentioned and other objects, advantages of the invention, as well as the novel features by virtue of which they are achieved, will be described with reference to the accompanying drawings in which:

FIG. 6 shows the detector circuit, FIG. 7 the cycle counter circuit, FIG. 8 the timing counter circuits and FIGS. 8A and 8B jointly show the output circuit. Both the threshold discriminating means and the pulse extracting means are included in the detector circuit, while the counting means are included in the cycle counter and timing counter circuits.

As stated, where sampled signals display an ideal waveform, signal discrimination is carried out in the manner as illustrated in FIG. 2(a) to FIG. 2(b). A voice-frequency or sonic-frequency signal generated from generator SO1 in FIG. 1, for example, is turned into a sampled signal S$a$ comprising pulses $a$, as shown in FIG. 2(a), whereas a signal from SO2 is turned into a sampled signal S$b$ comprising pulses $b$. These two sampled signals are then multiplexed on a time division system and sent out to the signal discriminator via a common transmission line. The signal discriminator includes a threshold discriminating means set at a fixed level V$t$ which senses those sampled pulses in the signals which exceed the level V$t$, as illustrated in FIG. 2(b). Because the signal discriminator operates on the time division system, the sampling time of the signal S$a$ can be considered separately from that of the signal S$b$, and thus the pulses picked up from S$a$ assume a form as shown in FIG. 2(c). If logically differentiated, these pulses are converted into particular pulses so illustrated in FIG. 2(d).

As is evident from FIG. 2, these particular pulses are extracted one by one every time the sampled signal S$a$ exceeds the threshold level V$t$ and thus it follows that the interval of pulses $ao$ is equal to one cycle of the sampled signal. Hence it is possible to know the frequency of S$a$ by directly measuring the interval between two successive pulses $ao$ or computing its mean value or again by counting the recurrence rate of these pulses within a fixed time. The same principle also applies to the frequency measurement of S$b$.

Figure 3:
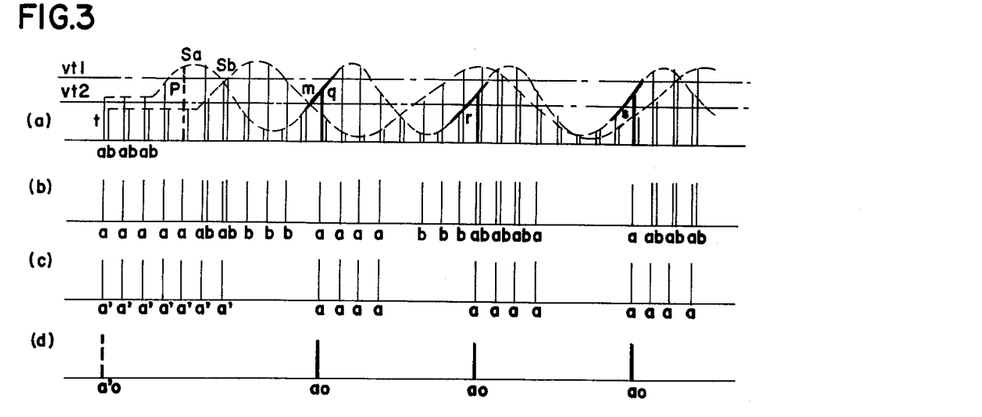
FIG. 3 illustrates the principle of signal discrimination when two threshold discriminating means are uesd.

In practical cases, however, it often occurs, as represented by S$a$ in FIG. 3, that a sampled signal exhibits an irregular waveshape during the start of its first cycle and also exceeds the threshold level at that time. If the sampled pulses $a$ of this signal are picked up exclusively where they exceed the threshold level V$t$, they form the pulse train shown in FIG. 3(c). As a result particular pulses are extracted from each pulse group in the manner as shown in FIG. 3(d). The extracted pulses include a pulse $a'o$ as well as $ao$. Because the interval between the pulse $a'o$ and the immediately following pulse $ao$ exceeds 1 cycle of S$a$, a discrimination error occurs if this interval is mistakenly measured. For this reason it is desirable that the pulse $a'o$ should remain unextracted. Cancelling of $a'o$ can be accomplished by providing two threshold levels, as described before. In FIG. 3(a), the threshold level V$t2$ corresponds to V$t$ in FIG. 2(a) and another threshold level V$t1$ is set higher than V$t2$. The signal S$a$ applied to the discriminator is sensed only after it exceeds V$t1$ for the first time, that is to say, only after occurrence of the sampled pulse P the discriminator is then made operative. Thereafter extraction of the particular pulses $ao$ starts when S$a$ exceeds V$t2$ at the point $m$, $a'o$ is thereby successfully cancelled. Then, the frequency measurement of S$a$ can be precisely carried out through the medium of the pulse interval of $ao$.

As known from the above description, the newly invented method of voice-frequency discrimination features the measurement of the interval of particular pulses in digital terms, with sampled signals left T.D. multiplexed. The frequency measurement thus being completed, sampled signals are discriminated from one another by means of a single decoder and picked up through the respective signal output lines in coded conditions and T.D. multiplexed.

Before describing the operation of the discriminating networks shown in FIG. 6 to FIG. 16, the following explains the circuit symbols used in the figures.

Figure 4:
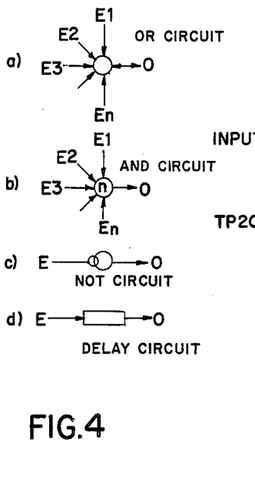
FIG. 4 illustrates circuit symbols used in FIGS. 6 to 16.

In FIG. 4, (a) shows an OR circuit, of which the output Out is given by the logical equation $$Out = E1 + E2 + \ldots + En$$

where E1, E2, ... En are the inputs of the circuit; (b) shows an AND circuit, the relation between the output Out and the inputs E1, E2, ... In can be logically expressed as $$Out = E1 \cdot E2 \cdot \ldots En$$

(c) shows a NOT circuit, of which the output Out is the negative of the input E and logically given as $$Out = NOT\ (E)\ \text{or}\ Out = \overline{E}$$

and (d) represents a delay circuit with the capacity of plural bits, e.g. 99 bits. The delay circuit of (d) in FIG. 4 is composed of magnetostrictive delay wires or other substances, having the delay time of 99 $\mu$sec. The invention however contemplates use of other delay devices such as artifical delay lines of lumped parameters, crystal delay lines, etc.

The circuits in FIG. 4 are well known and may be embodied in many ways. The circuit inputs are shown by arrows to the components; outputs, away from the components. The numeral within the AND circuit symbol signifies the number of input signals required to produce an output signal from the AND circuit. That is it represents $n$ in the equation $$Out = E1 \cdot E2 \cdot E3 \cdot \ldots En$$

The discrimination of sampled voice-frequency signals is effected, as described before, by two methods, i.e. by measuring the time taken by a fixed number of cycles of T.D. multiplexed signals and by counting the number of their cycles within a fixed time.

With the first method, theoretically speaking, the measuring time unit used has no limit. It is however evident that signal discrimination can be accomplished more quickly the smaller the time unit is set. Of course the time unit cannot be set smaller than the sampling period, because the voice-frequency signals are T.D. multiplexed. A time unit equal to the sampling period multiplied by an integral number, will involve a comparatively long discrimination time. Accordingly, a convenient length of the measuring time unit will be the one identical with the sampling period. In the following example, voice-frequency signals are classified into 10 kinds, the respective frequencies $f, f, \ldots f$ being set as shown below.

| | | | | |
|---|---|---|---|---|
| f1 | 500 c./s. | f6 | 0.921 kc./s. |
| f2 | 565 c./s. | f7 | 1.04 kc./s. |
| f3 | 638 c./s. | f8 | 1.18 kc./s. |
| f4 | 721 c./s. | f9 | 1.33 kc./s. |
| f5 | 815 c./s. | f10 | 1.50 kc./s. |

Each frequency is allowed an error of within ±3% and the recurrence frequency of sampled pulses is fixed at 10 kc./s., or the sampling period equals 100/$\mu$sec. So far as this example is concerned, it is necessary that time measurement should cover at least 5 cycles of each voice-frequency signal. This is because in the worst case the time period difference between the upper limit of one frequency and the lower allowable limit of the next higher frequency may be small. Such a small difference occurs between the signals $f9$ and $f10$. The smallest frequence difference between the respective cycles here is given as $$\frac{1}{1.33 \times 10 \times 103} - \frac{1}{1.50 \times 10 \times 0.97} = (0.730 - 0.687) \times 10^{-3}$$

$$= 0.0043 \times 10^{-3} (\text{seconds})$$

If the time measurement should cover $k$ cycles of a signal, the above difference multiplied by $k$ must exceed twice the sampling period, i.e. 100/$\mu$sec. Thus, $$k \times 0.043 \times 10^{-3} > 200 \times 10^{-6}$$

$$\therefore k > \frac{200}{43} = 4.65\ (\text{cycles})$$

It follows that the number of the least allowable cycles is 5.

Timing or time measurement is carried out by counting the number of sampled pulses involved in these cycles on the octonal scale and pulse number for the respective signals is fixed as follows.

| | | | | |
|---|---|---|---|---|
| f1 | 140–150 | f6 | 64–71 |
| f2 | 125–134 | f7 | 56–61 |
| f3 | 113–121 | f8 | 50–54 |
| f4 | 103–110 | f9 | 44–47 |
| f5 | 73–100 | f10 | 40–43 |

If, therefore, the timing counter circuit has registered, for instance, the number 140 to 150 or 125 to 134, the received signal is recognized to be $f1$ or $f2$, respectively.

Figure 5:
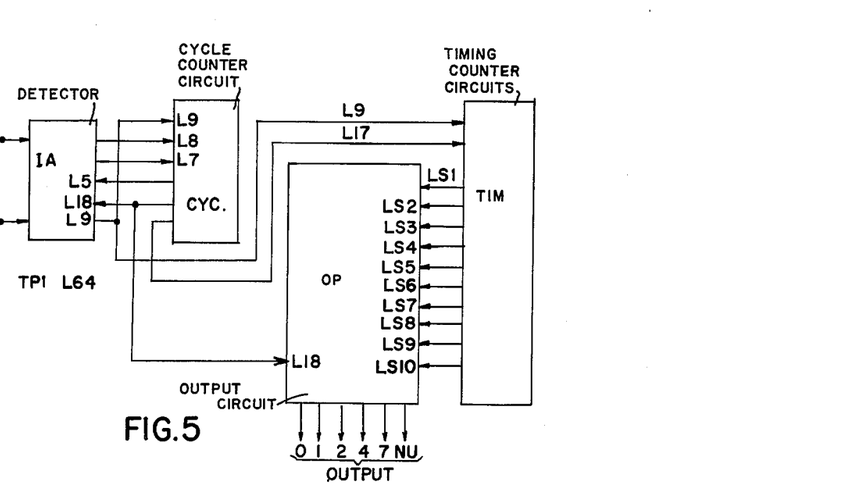
FIG. 5 is a block diagram of the signal discriminating network, details of the individual circuits being given in FIG. 6 to FIG. 9. More specifically.

The component circuits of the discriminator according to the invention are schematically arranged as illustrated in FIG. 5. Referring to the figure, a detector circuit IA receives T.D. multiplexed voice-frequency signals and possesses two threshold discriminating means. The first threshold discriminating means examines each signal to see if it exceeds the threshold level V$t$1. As noted in FIG. 3(a), the first means yields an output corresponding to an input signal for one channel when the signal has exceeded V$t$1. The counting operation is then started. Meanwhile, the second threshold discriminating means yields output pulses as shown in FIG. 3(b) and FIG. 3(c), when input signals exceed the level V$t$2. The output pulses are then logically differentiated in a detector circuit by reference to the discrimination of the first means and turned into output pulses shown in FIG. 3(d), to be applied to the cycle counter circuit CyC. Besides these two discriminating means, the detector circuit IA includes two timing clear means. One clear means is of an automatic type and the other is designed to function every time discrimination of one signal has been completed.

The cycle counter circuit CyC in FIG. 5 counts the number of particular pulses $ao$ from IA on the T.D.M. system. When no pulses of a particular character pass through a certain channel, the latter instructs the detector circuit I$a$, at every sampling time allotted to the same channel, by sending a signal signifying that the cycle count is 0. As a result the detector circuit can receive another train of other particular pulses through the channel. Accordingly, when the instruction signal is absent in regard to one channel, new particular pulses are prevented from entering through the channel.

In addition to the above signal, the circuit CyC sends other kinds of instruction signals. Namely, if particular pulses through a certain channel count 1 to 5, it signifies that fact to the timing counter circuits T$im$ at every sampling time allotted to the same channel. Again, an instruction signal signifying that the cycle count is 6 is also given to IA in the same manner, whereupon IA recognizes the instruction, and starts the timing clear means. At the same time the same signal passes to the output circuit OP to open a proper output gate. As for the timing counter circuits T$im$, they time, say 5 cycles of voice-frequency signals by counting, on the T.D.M. system, the number of sampled pulses through those channels for which the above instruction signal is given. Since the circuits T$im$ in the example in FIG. 5 are required to count the number 150 at maximum on the octonal scale, they include, for instance, two 3-bit T.D.M. counter circuits and one 1-bit T.D.M. memory device. According to the number counted, the timing counter decides which one of the 10 voice-frequencies the signal belongs to, and passes an output to one of the 10 lines L$s$1 to L$s$10 that correspond to that one of the frequencies $f1$ to $f10$. These 10 lines connect to the output circuit OP, which in turn converts a signal traversing one line into a code (e.g. a "2 out of 5" code) and transmits it through an output gate which opens when the cycle counter circuit has registered the number 6. In case the detector circuit IA has received an erroneous signal such that the output of the circuit T$im$ fails to occur in any of the 10 lines, a special signal informing this fact passes from one of the output gates of OP.

Figure 6:
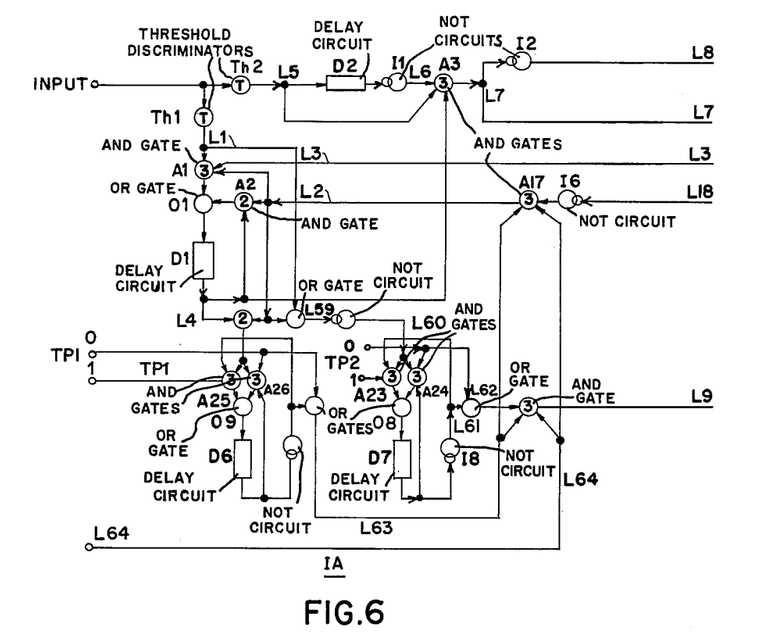

Fuller details of the circuits IA, C$y$C, T$im$ and OP in FIG. 5 are shown in FIGS. 6 to 9. These figures utilize the components described with reference to FIG. 4. The inputs to each component are shown by arrows to the component and the outputs by arrows away from the components. FIG. 6 illustrates details of detector circuit IA if an input sample signal is applied to the terminal INPUT of the detector circuit IA. A first threshold discriminating means T$h$1 starts functioning at the moment when the signal exceeds the level V$t$1. Then threshold discriminating means T$h$1 emits a fixed level of output signal exclusively through one channel to the AND circuit A1 via the line L1. In the event that signals are also supplied through both the lines L2 and L3 at this moment, the signal on the line L1 appears in the output of A1 and it is led to the delay device D1 after passing the OR circuit O1. The delay device D1, like all the other ones in the circuit, is designed to retard an input signal by the time equal to the sampling period of each channel. Accordingly, the input signal of D1 is picked up in the output through the same channel and appears in the output line L4 with a time lag identical with one sampling period. If not stopped at the AND circuit A2, the output signal is fed back to the input of D1 and thus memorized by it. The output signal on L4 is also sent to the AND circuit A3 and imparts an instruction based on the discrimination of T$h$1.

Meanwhile, the input signal through the terminal INPUT is turned by the second threshold discriminating means T$h$2 into a fixed level of signal when it exceeds the level V$t$2. It is then applied to the delay device D2 and the AND circuit A3 via the line L5. At D2 the signal is retarded by the time equal to the sampling period and negated by the NOT circuit I1, thus cancelling the signal on the line L6. If no output signal is picked up from D2, on the other hand I1 passes a signal to the line L6. To clarify, referring to the sampled waveform of S$a$ shown in FIG. 3($a$), the moments when signals simultaneously exist on L5 and L6 correspond to the pulse position where S$a$ first exceeds V$t$2 and to the pulse positions $p, q, r$ and $s$. However, at the position $t$ the signal S$a$ is below the level V$t$1, with the result that no signal occurs on L1 and accordingly, on L4. Hence, A3, remains closed and sends no output into the line L7. After S$a$ exceeds V$t$1 at the pulse position P, an output signal occurs on L4 at every sampling time of the channel concerned. Thus at the pulse position $q, r$ and $s$ the circuit A3 is opened and sends selected output pulses $ao$ as shown in FIG. 3($d$) into the line L7. In short, a signal is present on the line L7 only when an input signal through one channel from the terminal INPUT has once exceeded the level V$t$1 and passed to the line L4 by being memorized in D1. Again the same input signal must also have exceeded the level V$t$2 at a sampling time, and the input signal must have been smaller than the level V$t$2 before a sampling period. Thereby a signal through one channel is obtained on L7 at every cycle of the input signal after the latter is received by the detector circuit. The negative of the signal on L7 appears on L8 because of the NOT circuit I2. It is clear that the operation of the detector circuit, as well as that of all the other component elements of the discriminator according to the invention is carried out on the T.D.M. system, and the number of channels can be increased as desired, say, up to 100 or more. The respective signals on the lines L7 and L8 are then applied to the cycle counter circuit C$y$C illustrated in detail in FIG. 7.

Figure 7:
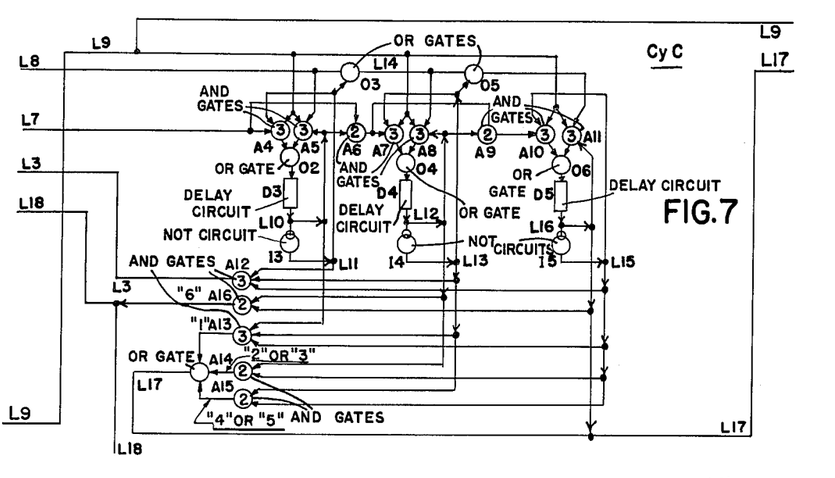

Until the moment when an input signal is applied through L7, the circuit C$y$C is in 0-count condition as far as the channel to which the input signal belongs is concerned. Therefore, the delay device D3 yields no output and, accordingly, no signal is present on the line L10. Then, a signal passes to L11, owing to the function of NOT circuit I3. When an input signal enters through L7, it is led to delay line D3 via AND circuit A4 and OR circuit O2, provided that a signal is existent on line L9 (of which explanation will follow later). The output signal of delay line D3 appears on line L10 with a time lag equal to the sampling period, for example, 100 microseconds. It then passes to AND gates A5 and A6. If input signals are present on lines L8 and L9 at this moment, the signal on line L10 is fed back to the input of delay D3 via AND circuit A5 and OR circuit O2, whereby it is memorized by D3. Thus the cycle counter has registered the number 1.

When a second input signal enters through L7, the signal on L8 disappears in its turn. Then A5 is blocked because of the above-mentioned circulating memorization and A4 is likewise blocked. In default of a signal on line L11 resulting from the presence of the signal on L10. Accordingly, the input signal is not fed to D3, with the result that its storage disappears so far as the channel in question is concerned. However, the input signal through line L7 is supplied to AND circuits A7 and A9 as a carry signal via AND circuit (or AND gate) A6, owing to the existence of the signal on line L10. Since no signals exist at this moment both on lines L8 and L11, OR circuit (or OR gate) O3 does not yield an output on line L14. Again, the absence of signal on line L12 produces a signal on line L13 and thus the output of AND A6 is fed to delay line D4 via AND gate A7 and OR gate O4. The signal picked up through line L12 is then fed back to delay line D4 via AND gate A8 and OR gate O4 and memorized there. This means that the cycle counter has registered the number 2. A third input signal provided through line L7 is memorized by delay line D3 in the same manner as the first input signal, whereupon the cycle counter registers the number 3. When a fourth input signal arrives, the storage of D3 disappears as when the second input signal is supplied to the circuit. At the same time a carry signal passes to AND gate A7, L11 loses its signal and thus the storage of D4 also disappears. However, signals exist at this instant both on lines L12 and on the output line of AND gate A6, with the result that a signal is generated on the output line of A9. This signal is memorized by D5 in the same manner as in the case of D3 and D4 and thus the cycle counter registers the number 4. By repeating the above procedure, the counter is capable of registering the number up to 7. Needless to say, the counting operation is carried out with regard to all the channels of the T.D.M. system.

If the cycle counter circuit C$y$C is in 0-count condition for one channel, no signals occur on the lines L10, L12 and L16 through the identical channel. Accordingly, signals pass to lines L11, L13 and L 15 through the NOT circuits I3, I4 and I5, respectively. These signals pass to the AND circuit A12, the output of which is picked up through the line L3 to control the cricuit A1 of IA at every sampling time of the channel under 0-count condition. As for the channel through which the cycle counter has registered the number 1, signals pass to lines L10, L13 and L15 at every sampling time and they feed to AND gate A13. In case the counted number is 2 or 3, lines L12 and L15 produce signals to be applied to AND circuit A14, and again, in case the counted number is 4 or 5, lines L13 and L15 produce signals to be fed to AND gate A15. Thus, when the circuit C$y$C has counted any of the numbers 1, 2, 3, 4, and 5 through one channel, an output signal is obtained through the line 17 and it is then sent to the timing counter circuit T*im*. As far as one particular channel is concerned, it is evident that the duration of the output signal on line L17 is identical with 5 cycles of the input voice-frequency signal 8 the same channel. Therefore, it is possible for the timing counter circuit T*im* to measure the duration and thereby to discriminate the voice-frequency signal from other signals. Although the cycle counter shown consists of 3-bit binary counter circuits and T.D.M. logical circuits, the invention may be otherwise embodied.

Figure 8A:
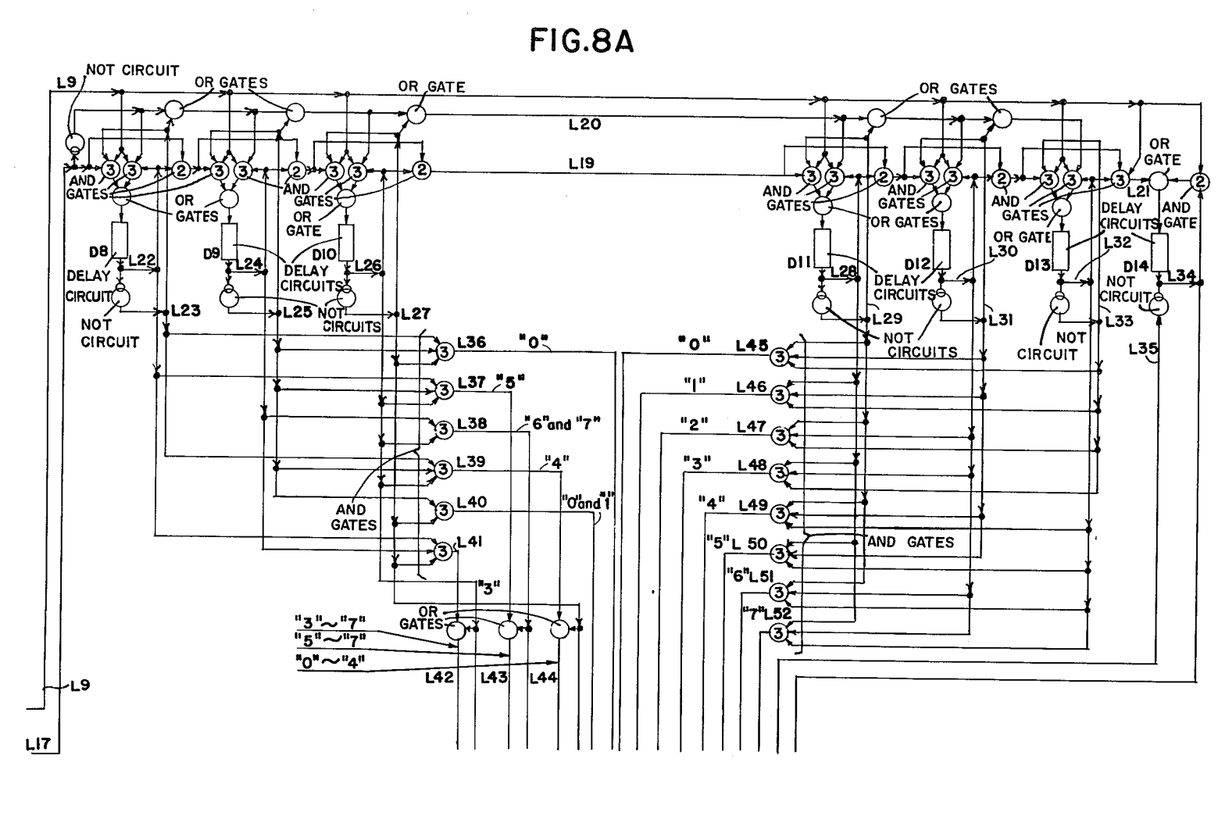
Figure 8B:
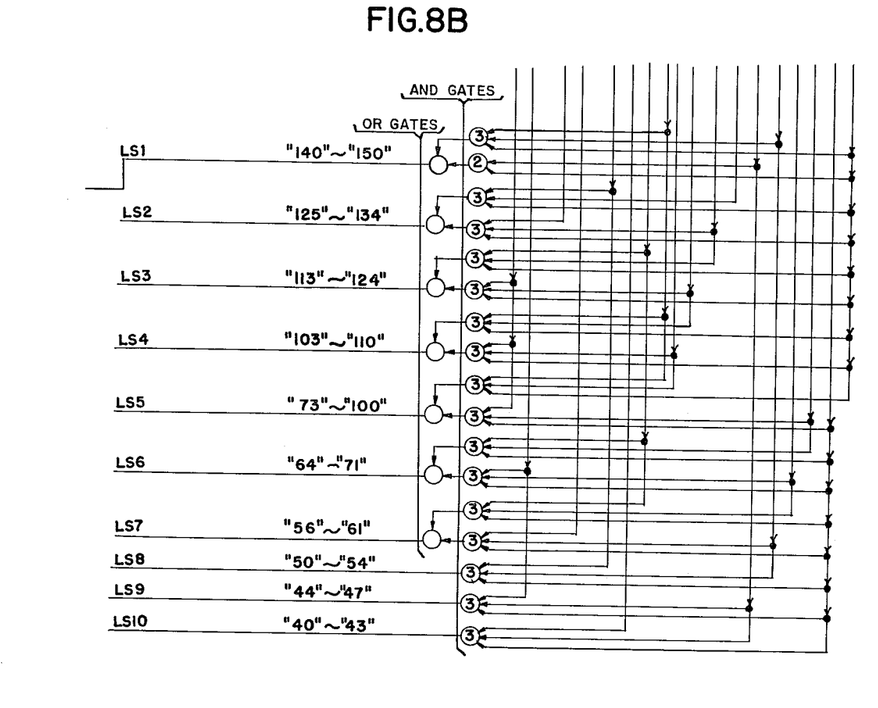

The timing counter T*im*, as illustrated in FIGS. 8A and 8B, performs the function, described above, of measuring the time of 5 cycles of input voice-frequency signals on the T.D.M. system. This network is composed of similar counter circuits to those of C*y*C. Referring to FIGS 8A and 8B, the 3-bit counter circuits connected to line L17 count the number from 0 to 7 and at an eight input signal they are turned into 0-count condition, passing a carry signal to line L19 and its negative to line L20. Namely, the first 3-bit counter circuits form an octonal counter. The next 3-bit counter circuits connected with L19 and L20 also operates on the octonal scale, and counts numbers in the second column (corresponding to the order of 10 on the decimal scale). The output carry signal then passes to delay line D14 via line L21 and is memorized there as a number in the third column. When the first 3-bit counter is in 0-count condition with reference to one channel, signals are absent on lines L22, L24 and L26, with the result that lines L23, L25 and L27 receive signals, which are logically multiplied and turned into an output signal line on L36. In the same manner line L37 receives an output signal when the counter circuits have registered the number 5. Again, when the first 3-bit counter has registered the number 6 or 7, signals are present in lines L24, L26 and, accordingly, absent in lines L25 and L27. Hence line L38 is given an output signal. Lines L39, L40 and L41 receive output signals when the counter has registered the numbers 4, 0 or 1, and 3, respectively. Consequently, line L42 and L43, L44, obtain output signals at every sampling time of the corresponding channel if the counter has registered the numbers 3 to 7, 5 to 7 and 0 to 4, respectively. The same principle applies to L45, L46 . . . L52, which are given output signals when the second 3-bit counter has registered the numbers 0, 1, 2 . . . 7, respectively.

If the timing counter has counted, say, the number 140 on the octonal scale for a particular channel, line L49 alone out of the lines L45 to L52 receives an output signal. Meanwhile, the signal present in line L34 causes the absence of signal in line L35, and thus the output of the timing counter is picked up on the line L*s*1. Through similar procedures the output of the timing counter corresponding to different counted numbers appears on one of the lines L*s*1 to L*s*10. The correspondence between the counted numbers and these lines is listed below.

Number: | Line
--- | ---
140 to 150 | L*s*1
125 to 134 | L*s*2
113 to 121 | L*s*3
103 to 110 | L*s*4
73 to 100 | L*s*5
64 to 71 | L*s*6
56 to 61 | L*s*7
50 to 54 | L*s*8
44 to 47 | L*s*9
40 to 43 | L*s*10

This implies that the kind of a sampled voice-frequency signal can be recognized from the line out of lines L*s*1 to L*s*10 in which the output of the timing counter is picked up.

Figure 9:
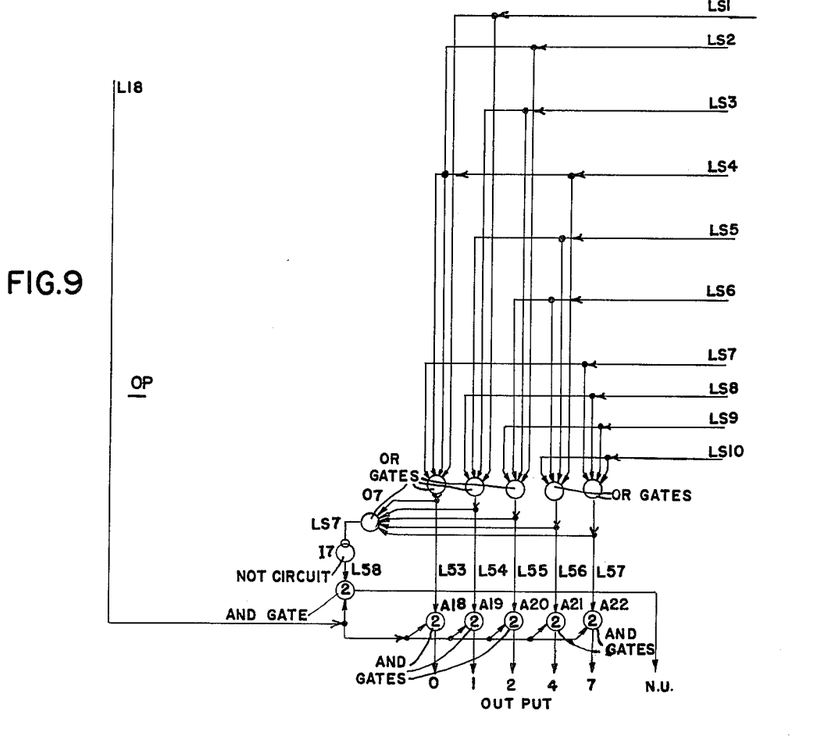
Figure 10:
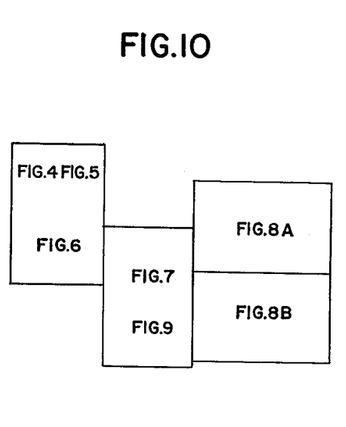
FIG. 10 shows the relative position of the circuits in FIG. 6 to FIG. 9.

Signals thus discriminated are then applied to the output circuit OP shown in FIG. 9, where they are converted into code signals for the purpose of simplifying the structure of a transmitting device to be connected to the signal discriminator. The output circuit illustrated in FIG. 9, performs coding of signals by the "2 out of 5" system, which means that a signal passes simultaneously to two of the five lines L53 to L57. For instance, a signal, on the line L*s*1 passes simultaneously to lines L53 and L54, so far as the channel to which the signal belongs is concerned. This coding system is of course a mere example and can be altered otherwise. The operation of the output circuit is carried out on the T.D.M. system. Since signals appear on the lines L53 to L57 even during the counting processes of T*im*, they cannot be considered to inform correct discrimination results until the cycle counter has registered the number 6 with regard to the channel concerned. Whereupon, signals pass simultaneously to lines L12 and L16, FIG. 7, with the result that line L18 obtains a signal via AND gate A16, and applies it to the AND circuits A18 to A21 of OP. Then the signals on L53 to L57 are allowed to enter the output lines 0, 1, 2, 4, and 7. The signal on line L18 is also negated by NOT circuit I6 in the detector circuit IA, FIG. 6, and thus it cancels the signal on line L2, to block AND circuits A1 and A2. Accordingly, the storage in delay D1 disappears and subsequently line L4 loses the signal, blocking AND gate A3. The signal on line L7 then disappears, holding the cycle counter under 6-count condition. If the period of an input voice-frequency signal is incorrect or outside the specified range, no signals may occur on the lines L53 to L57. On such occasions the output line of OR circuit O7, FIG. 9, receives no signal and the line L58 in turn receives a signal, which is conveyed to the line NU exclusively when the cycle counter has registered the number 6 and at a sampling time of the channel concerned, to indicate that the input voice-frequency signal does not belong to the specified kind.

The recognition of one input voice-frequency signal being completed in this manner, preparations are made in the same channel for receiving a next input signal. If the input signal still keeps at a sufficiently high level after the discriminator has been cleared, the same signal will be again received mistakenly. To prevent this, the detector circuit IA is equipped with a timing clear device. Since the maximum period of an input voice-frequency signal in the signal discriminator of the example is approximately 206 milliseconds, all the working network can be restored if a signal is not passed to line L1, FIG. 6, within 206 milliseconds of the registration of the number 6 in the cycle counter.

This clearing is effected in the following manner. Of the two lines 0 and 1 connected to the terminals TP2, FIG. 6, the latter has applied thereto timing pulses of a period of, say, 2.1 milliseconds, and with a duration equal to the sampling period, i.e. 100 microseconds in this example. Meanwhile, the former line receives timing pulses of the same period but opposite in phase. Thus the timing pulses passed to the line 0 will have an interval equal to the duration of those given to the line 1. These two kinds of timing pulses are checked at AND gates A23 and A24 at every sampling time of particular channels for which signals are existent in lines L1 or L2 and accordingly, in line L59. However, for other channels a pulse on the line 1 is applied to delay D7 after passing AND gate A23 and OR gate O8 at a sampling time of the channel. The output of delay circuit D7 is fed back via AND gate A24 and OR gate O8 and memorized by delay circuit D7. In case the input voice-frequency signal exceeds the threshold level V*t*1 before a second timing pulse comes and thus a signal passes to line L1, or in case line L2 obtains a signal to prevent the detector circuit from restoring, line L60 is not given a signal, with the result that AND gates A23 and A24 are blocked and consequently the storage delay of delay circuit D7 disappears. As for a channel for which signal discrimination is completed, line L2 loses signal and line L60 in turn obtains a signal provided that no signal exists in line L1. Thus a timing pulse is memorized by delay circuit D7. Again, because the signal on line L61 disappears for the channel concerned through the function of I8, the lead or line 0 loses the signal when a second timing pulse is applied thereto, with the result that line L62 and, accordingly, line L9 lose the signal. Thereupon all the memories in the cycle counter and the timing counter disappear, restoring the whole discriminating network so far as the particular channel is concerned.

It may also occur that though an input voice-frequency signal has been received by the detector circuit and memorized by delay circuit D1, it does not extend over a period of 5 cycles. To prepare against such erroneous reception, the detector circuit IA is equipped with another timing clear device for each channel. With the signal discriminator of the example, the maximum time required for a signal recognition is 10.3 milliseconds. If a number registered by the cycle counter falls short of 5 in the duration of 10.3 milliseconds after the reception of a sampled input signal and does not cancel the signal on line L2, the latter signal as well as the signal on line L9 are cancelled, whereby all the discriminating circuits are automatically restored. This function, in the discriminator embodying the invention, is performed by a timing circuit of the same type as the one described in the foregoing paragraph.

Referring to FIG. 6, the lines 0 and 1 connected to the terminals TP1 respectively have applied thereto timing pulses of the opposite phase to each other, as in the case of the timing pulses TP2. The pulses for the line 1 have a repetition period of 11 milliseconds and a pulse width of 100 microseconds. When signals exist in lines L4 and L2, a timing pulse for the channel concerned is memorized by delay circuit D8 through circulation. Unless lines L4 and L2 lose the signals before the arrival of a second timing pulse and thus erase the storage of delay circuit D8, the second pulse cancels the signal on line L63, and accordingly, the signals on lines L2 and L9. Thereupon the whole discriminating network is cleared so far as the channel of interest is concerned.

The two above-described timing clear devices are a mere example and can be modified to function more precisely as the occasion demands. If it is necessary, for some reason, to effectively clear the discriminator at a sample time of a particular channel, it is enough to cancel the signal on line L64 for the channel concerned.

Figures 11, 12:
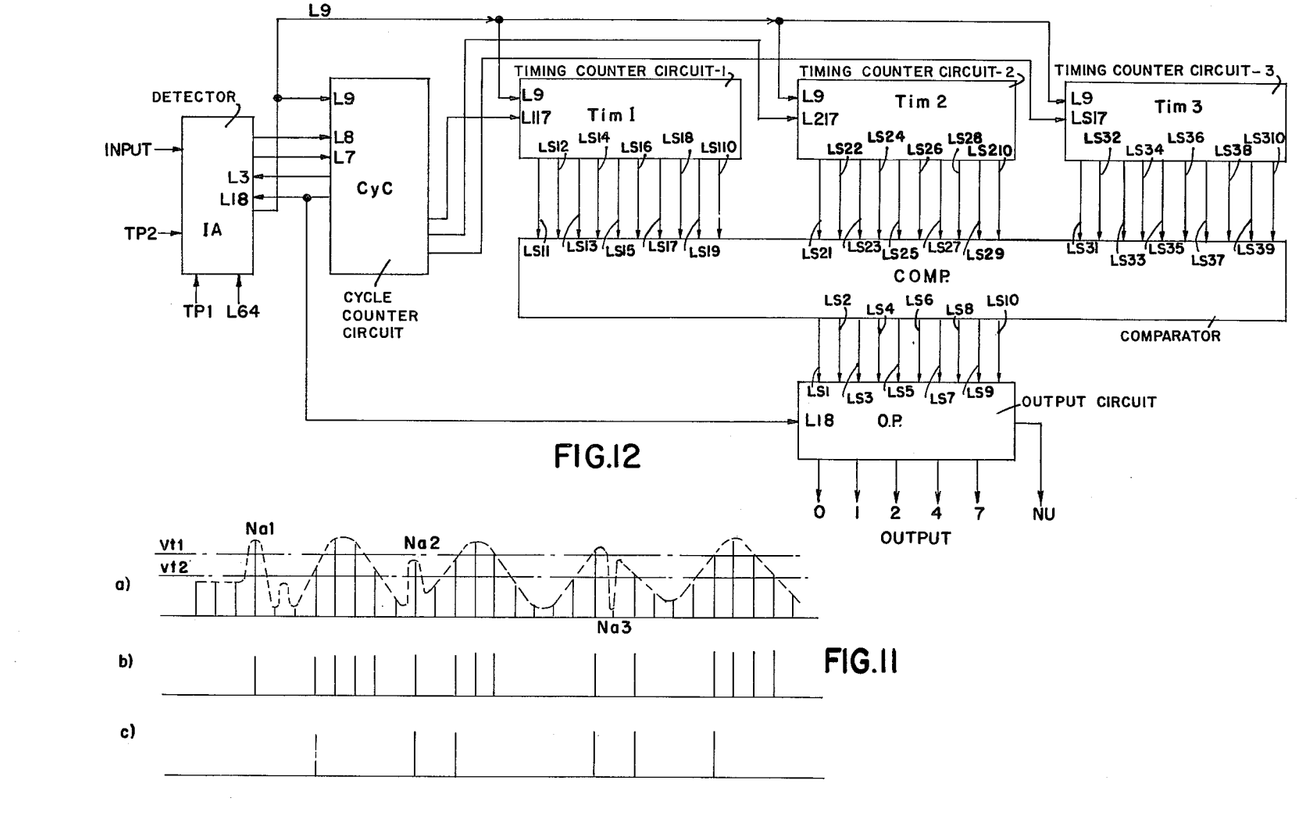
FIG. 11 is an explanatory graph representing the interference of an accidental noise signal mixed in a sampled voice-frequency signal.
FIG. 12 shows an example of signal-discriminator circuitry with a cycle computing circuit, which repeats cycle computation three times and determines it by the majority, whereby it serves the purpose of preventing error discrimination resulting from the interference of accidental noise signals. The detector circuit IA, the timing counter circuits T$im$ 1, 2 and T$im$ 3 and the output circuit OP involved in this example are of the same type as those shown in FIG. 6, FIG. 8 and FIG. 9.

The foregoing description is confined to cases where the waveform of input voice-frequency signals is not distorted and no noise signals are mixed in the input. Our invention also solves the problem of frequency measurement when abnormalities of this kind exist in input signals. FIG. 11($a$) illustrated an example of distorted waveform for one channel, while FIG. 11($b$) and FIG. 11($c$) show respectively the pulse train picked up from the same signal in terms of the threshold level $Vt2$ and the particular pulses obtained through logical differentiation. Since the signal discriminator starts functioning when an input signal first exceeds the threshold level $Vt1$, discrimination errors will occur if a mixed noise signal exceeds $Vt1$ before a normal input signal. Even when starting is correctly effected, discrimination errors are likewise involved if another noise which exceeds the threshold level $Vt2$ exists.

We prevent such errors in accordance with another feature of the invention. Because the interval of particular pulses differs from the period of an input voice-frequency signal if a noise signal is coexistent that exceeds $Vt2$, it is difficult, theoretically speaking, to discriminate individual frequencies. From a statistical viewpoint, however, discrimination errors will decrease by setting the level of input voice-frequency signals sufficiently higher than that of noise. Accuracy of discrimination may be increased by measuring the interval of particular pulses several consecutive times and by comparing the results to eliminate wrong ones. Again, if proper statistical computations are performed on the results of a series of measurements, discrimination errors can be reduced to minimum. Error starting caused by a noise exceeding $Vt1$ in advance of normal input signals can be removed by providing a proper interval between the starting of the discriminator and that of cycle counting and regulating this interval as the occasion demands.

FIG. 12 illustrates an example of circuitry embodying features of the invention and specially designed as a counter-measure against the interference of noises and operating on the above-described principles. FIG. 12 includes 3 timing counters and a comparator intended to measure the time of 5 cycles of a signal 3 times and decide a correct value by majority. The detector circuit IA, the 3 timing counter circuits Tim 1, Tim 2 and Tim 3 and the output circuit OP are of the same type as shown in FIG. 6, FIG. 8 and FIG. 9, respectively. Details of the cycle counter circuit CyC, the comparator COMP, appear in FIG. 13 and FIG. 14 respectively. The numeral designation of the different lines in the network of Tim 1, Tim 2 and Tim 3, FIG. 12, differs from that used for the timing counter circuit illustrated in FIG. 8, in the aspects shown in the list below.

*Numeral designation*

| Timing counters | Tim (Fig. 8) | Tim 1 (Fig. 12) | Tim 2 (Fig. 12) | Tim 3 (Fig. 12) |
| --- | --- | --- | --- | --- |
| Lines | L17<br>Ls1<br>Ls2<br>.<br>.<br>Ls10 | L117<br>Ls11<br>Ls12<br>.<br>.<br>Ls110 | L217<br>Ls21<br>Ls22<br>.<br>.<br>Ls210 | L317<br>Ls31<br>Ls32<br>.<br>.<br>Ls310 |

The detector circuit IA, the 3 timing counters Tim 1, Tim 2 and Tim 3 and the output circuit OP function in the same manner as in the example in FIG. 5. Namely, IA receives T.D.M. sampled input signals separately according to the channels to which they belong and produces logically differentiated output pulses and their negative to the cycle counter CyC through lines L7 and L8, respectively.

Figure 13:
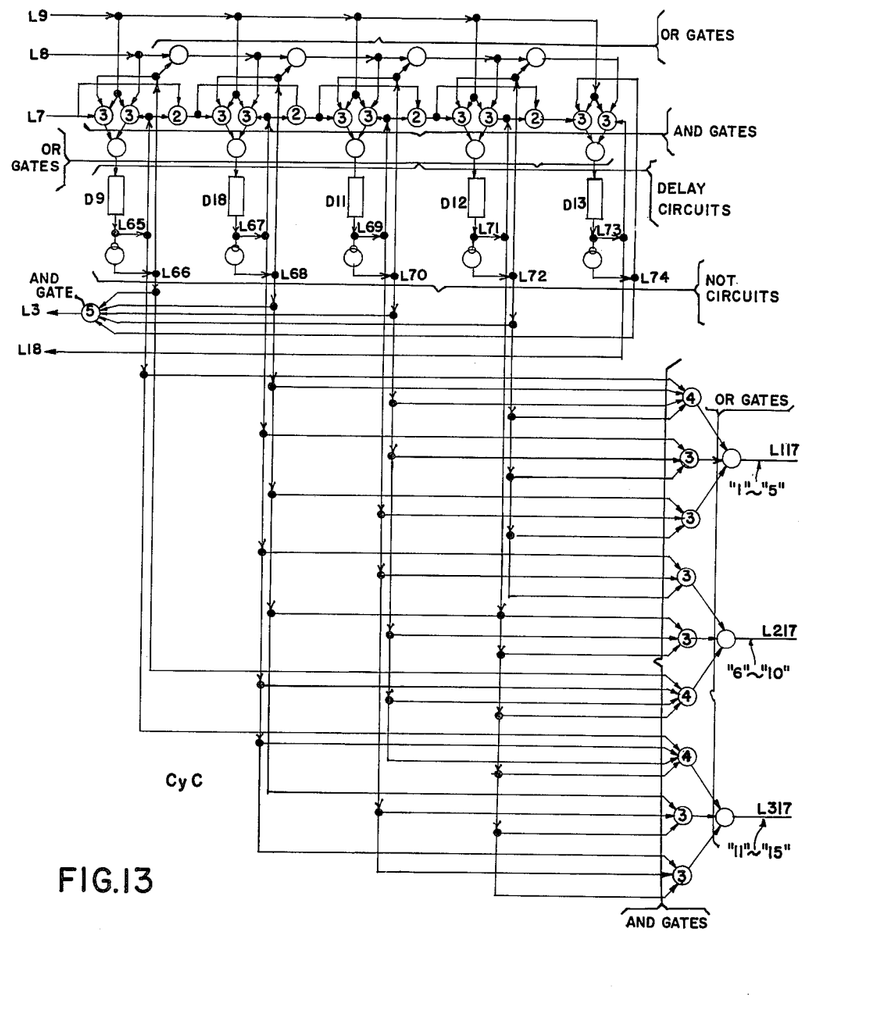
FIG. 13 and FIG. 14 show examples of the cycle counter circuit CyC and the comparator (majority decision circuit) COMP in the example in FIG. 12. Two other examples of the circuitry of the signal discriminator are shown in FIGS. 15(a) to 15(k) and FIG. 16 in terms of respective block diagrams.
Figure 14:
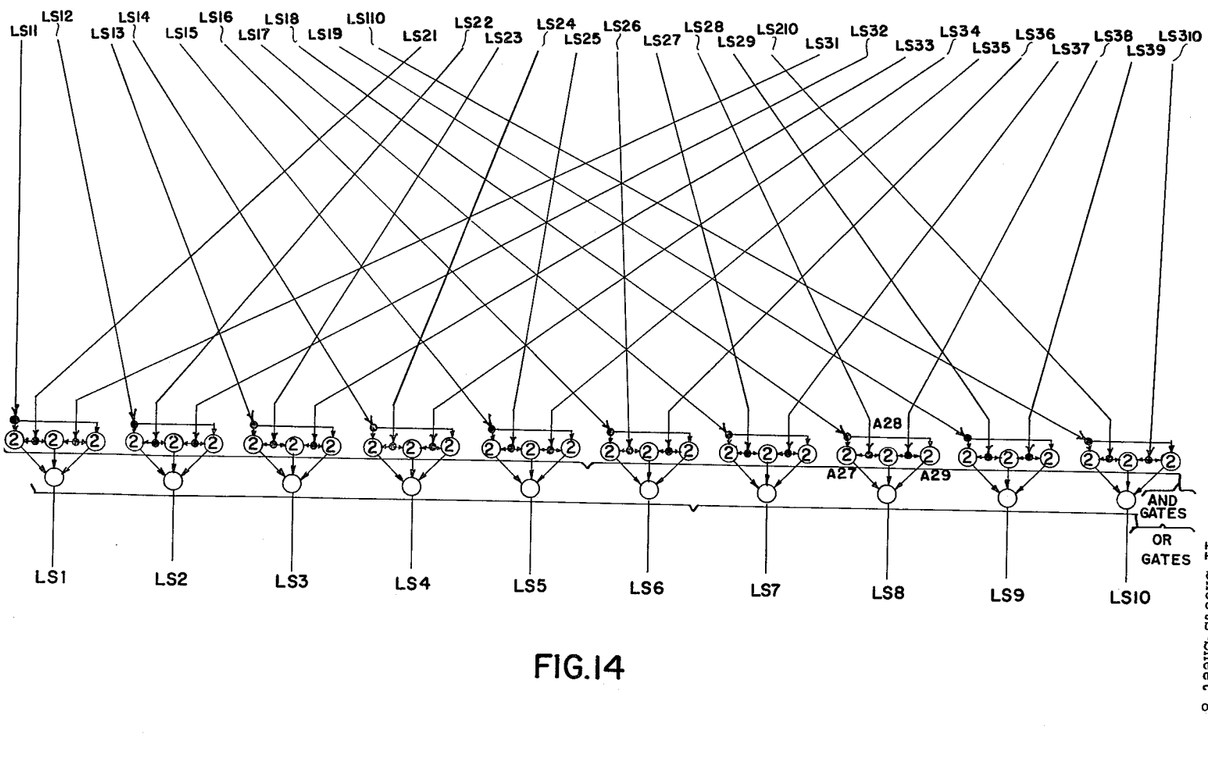

The Cycle counter CyC in FIG. 13 counts, in the same manner as the one shown in FIG. 7, the number of cycles of a given voice-frequency signal on the T.D.M. system and on the binary scale. The counter of FIG. 13 is the same in structure as that of FIG. 7, except that two more bits are added to the counter network inasmuch as the maximum number to be registered here is 16. The method of counting the number of cycles on the binary scale does not, as described before, form a necessary condition of the present invention, which contemplates altered circuits for particular needs. In the cycle counter exhibits 0-count conditions at a sampling time of a particular channel, the delay devices D9 to D13, yield no iutput, resulting in no signals existing on lines L65, L67, L69, L71 and L73. Accordingly, lines L66, L68, L70, L72 and L74 receive signals, which are logically multiplied and picked up on line L3. The output signal on line L3 in turn enables the detector circuit IA to receive an input sampled signal. With regard to a channel for which CyC has registered the number 1 to 5, 6 to 10 or 11 to 15, a signal is imparted to lines L117, L217, or L317, respectively. Since lines L117, L217, and L317 are connected to Tim 1, Tim 2 and Tim 3, respectively, these 3 timing counters register the numbers corresponding to the 3 lines. Thus Tim 1 counts the sampling pulses for the first 5 cycles of an input sampled signal for each channel, Tim 2 for the second 5 cycles and Tim 3 for the third 5 cycles. As for the details and operation of the 3 timing counters, reference may be had to the description of FIG. 8. When the cycle counter has registered the number 16, a signal is applied to line L73 exclusively at a sampling time of the channel concerned and sent to the detector circuit IA, FIG. 6, via line L18. Whereupon the memory in delay D1 for the channel in question disappears, stopping the output of 1A and thus holding CyC. Then the output of the timing counter T$im$ 1 passes at a sampling time of the channel concerned, to one of the lines L$s$11 to L$s$110, that of T$im$ 2 to one of the lines L$s$21 to L$s$210 and that of T$im$ 3 to one of the lines to L$s$31 to L$s$310.

The conversion of counted results into an output signal carried out inside each counter is based on the same principle as in the example shown in FIG. 8. Again, in addition to the system adopted here of transmitting an output signal through one of 10 lines, the invention contemplates variations therefrom. Assuming, for example, that T$im$ 1, T$im$ 2 and T$im$ 3 have registered the numbers 51, 54 and 44, respectively, on the octonal scale when CyC has counted the number 16 at a sampling time of a channel, then T$im$ 1 passes a signal to line L$s$18, T$im$ 2 to L$s$28 and T$im$ 3 to L$s$39. These signals are applied to the comparator COMP detailed in FIG. 14. As known from the figure, those signals given to lines L$s$18 and L$s$28 are led to the same AND circuit A27 and picked up on the line L$s$8, whereas the signal given to L$s$39 is cancelled in default of a signal on either L$s$19 or L$s$29. This results in no output signal being obtained on line L$s$9. This implies that a decision between the counting results of the 3 time counters was made by majority. In the same manner the comparator circuit performs the function of deciding by majority with respect to signals on the other lines L$s$11 to L$s$310 and 2 or more coincident counting results are obtained on one of the lines L$s$1 to L$s$10. "Counting results" here means those converted into coded signals so as to send a single signal into only one of the 10 lines.

In the above-described example, the number of counting results between which decision is made by majority is limited to 3. This number, however, can be increased to any extent by adding timing counters and the lowest allowable limit of the number of coicident counting results is fixed at 2 or a majority or a two-thirds majority.

The signal picked up on one of the lines L$s$1 to L$s$10 is then led to the output circuit OP, which functions in the same manner as the one in FIG. 9. As for the automatic timing clear effect, refer to the description of the preceding example. Thus we can decrease to a considerable degree the opportunities of discrimination error resulting from the interference of noises or a distorted waveform.

The second method which embodies the present invention for preventing discrimination error is to measure repeatedly the time of one or more cycles of an input sampled signal and obtain the correct frequency value of the signal by analyzing the results in statistical terms. The following is one example of this method, where the duration 1 cycle of an input signal is measured 10 times. Input signals are classified into 10 kinds, as in the former examples, according to their respective frequencies which are specified as follows.

| | | | |
|---|---|---|---|
| $f1$ | 0.500 kc./s. | $f6$ | 0.921 kc./s. |
| $f2$ | 0.565 kc./s. | $f7$ | 1.04 kc./s. |
| $f3$ | 0.638 kc./s. | $f8$ | 1.18 kc./s. |
| $f4$ | 0.721 kc./s. | $f9$ | 1.33 kc./s. |
| $f5$ | 0.815 kc./s. | $f10$ | 1.50 kc./s. |

Providing that the maximum frequency error of each input signal is ±3%, and that the pulse repetition frequency of sampled pulses to be used for sampling is 10 kc./s., the number of sampled pulses included in 1 cycle of the above 10 kinds of signals is as follows.

| | | | |
|---|---|---|---|
| $f1$ | 19–21 | $f6$ | 10–12 |
| $f2$ | 17–19 | $f7$ | 9–10 |
| $f3$ | 15–17 | $f8$ | 8–9 |
| $f4$ | 13–15 | $f9$ | 7–8 |
| $f5$ | 11–13 | $f10$ | 6–7 |

Thus it follows that the timing counters are required to register a number up to 21.

FIG. 15($a$) is a block diagram of the sample signal discriminator capable of frequency discrimination through means of statistical analysis. Referring to FIG. 15($a$), a detector circuit IA of the same type as shown in FIG. 6 performs the function of receiving input sampled signals multiplexed on the time division system. Detector circuit IA passes its output via the line L1 to the cycle counter CyC in terms of logically differentiated pulses, while the negative of the output is likewise applied to CyC via the line L2. When the cycle counter CyC has counted 11 pulses, i.e. 10 cycles of an input sampled signal, it suspends operation, so far as the channel to which the input signal belongs is concerned, by sending a signal to the output circuit OP as well as to the detector circuit IA and thus stopping output pulses of IA from entering the counter. Along with this, the cycle counter informs the interval of differentiated pulses at every cycle change of the input sampled signal to a proper one of the 10 timing counters T$im$ 1 to T$im$ 10, which in turn measures each cycle by counting sample pulses included in it. Namely, when the cycle counter has registered the number 1, the first interval of differentiated pulses is measured by T$im$ 1, and when it has registered the number 2 the second interval of pulses is in turn measured by T$im$ 2. In the same manner the third to tenth intervals of differentiated pulses are measured by T$im$ 3 to T$im$ 10, respectively. Each of the 10 timing counters, on counting the number of sampled pulses included in 1 cycle of an input signal, sends an output signal to one of the 8 cumulative counters SC1 to SC8 through one of 8 output lines, according to the following divisions of counted numbers.

| Division: | Counted number |
|---|---|
| 1 | 7 and downward. |
| 2 | 8 or 9. |
| 3 | 10 or 11. |
| 4 | 12 or 13. |
| 5 | 14 or 15. |
| 6 | 16 or 17. |
| 7 | 18 or 19. |
| 8 | 20 and upward. |

For instance, when T$im$ 1 has registered the number 7, which belongs to Division 1 in the above list, an output signal is produced at the terminal of the line L29, while if the registered number is 8 or 9 belonging to Division 2, an output signal is produced at the terminal of L30, and so forth. The correspondence between the above divisions and the output lines of the 10 timing counters is given in the list below.

| Division | T$im$ 1 | T$im$ 2 | T$im$ 3 | T$im$ 4 | T$im$ 5 | T$im$ 6 | T$im$ 7 | T$im$ 8 | T$im$ 9 | T$im$ 10 |
|---|---|---|---|---|---|---|---|---|---|---|
| 1 | L29 | L37 | L45 | L53 | L61 | L69 | L77 | L85 | L93 | L101 |
| 2 | L30 | L38 | L46 | L54 | L62 | L70 | L78 | L86 | L94 | L102 |
| 3 | L31 | L39 | L47 | L55 | L63 | L71 | L79 | L87 | L95 | L103 |
| 4 | L32 | L40 | L48 | L56 | L64 | L72 | L80 | L88 | L96 | L104 |
| 5 | L33 | L41 | L49 | L57 | L65 | L73 | L81 | L89 | L97 | L105 |
| 6 | L34 | L42 | L50 | L58 | L66 | L74 | L82 | L90 | L98 | L106 |
| 7 | L35 | L43 | L51 | L59 | L67 | L75 | L83 | L91 | L99 | L107 |
| 8 | L36 | L44 | L52 | L60 | L68 | L76 | L84 | L92 | L100 | L108 |

Out of the 8 cumulative counters SC1 to SC8, SC1 is connected to the lines L29, L37, L45, L53, L61, L69, L77, L85, L93 and L101 which convey those signals belonging to Division 1, and SC2 is connected to the lines which convey those signals belonging to Division 2 and so forth. Thus the relation among the registered number ($a$) in a timing counter ($b$), the division ($c$) to which the number belongs, the line ($d$) which conveys the output signal of the timing counter concerned, and the cumulative counter ($e$) to which the output signal is supplied will be better understood from the sample list below.

| a | b | c | d | e |
|---|---|---|---|---|
| 11 | T*im* 1 | 3 | 31 | SC3 |
| 13 | T*im* 2 | 4 | 40 | SC4 |
| 12 | T*im* 3 | 4 | 48 | SC4 |
| 12 | T*im* 4 | 4 | 56 | SC4 |
| 12 | T*im* 5 | 4 | 64 | SC4 |
| 13 | T*im* 6 | 4 | 72 | SC4 |
| 6 | T*im* 7 | 1 | 77 | SC1 |
| 11 | T*im* 8 | 3 | 87 | SC3 |
| 12 | T*im* 9 | 4 | 96 | SC4 |
| 12 | T*im* 10 | 4 | 104 | SC4 |

Figures 15A, 15J, 15K, 16:
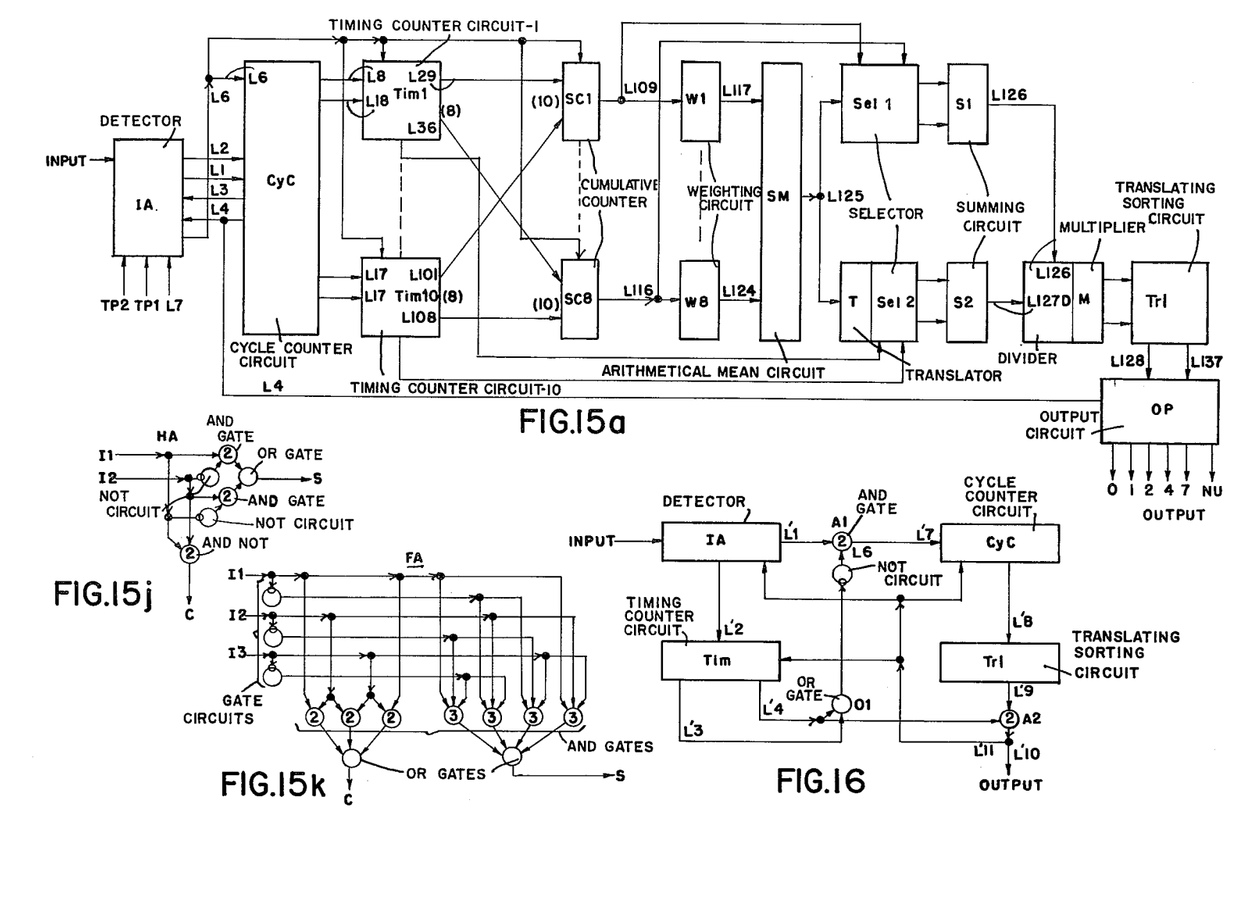
Figure 15B:
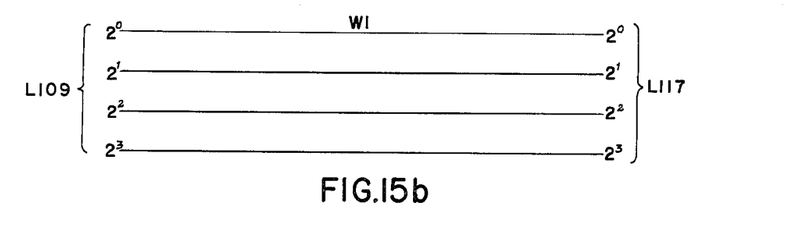
Figure 15C:
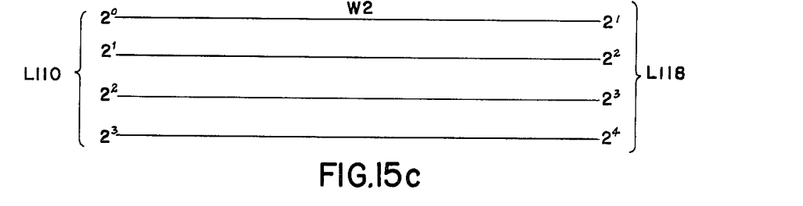
Figure 15D:
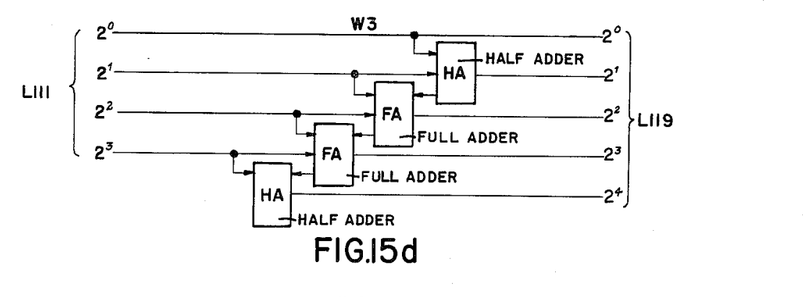
Figure 15E:
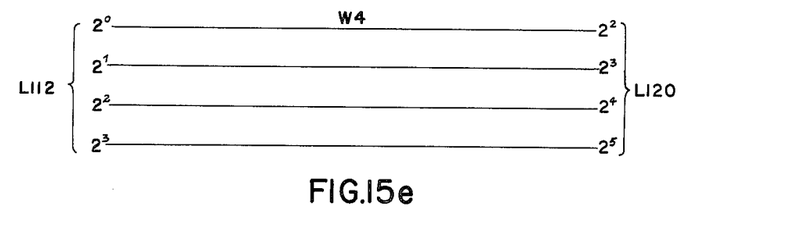
Figure 15F:
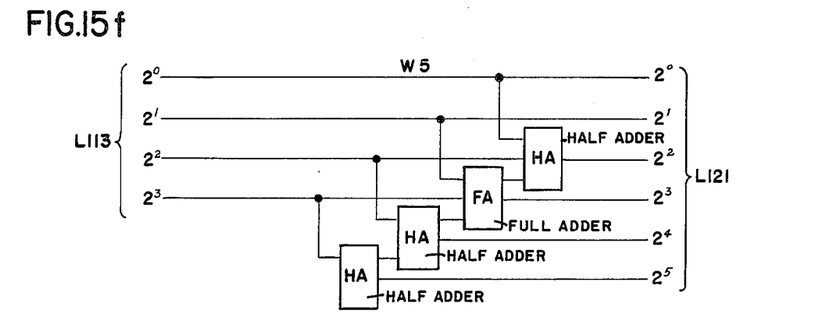
Figure 15G:
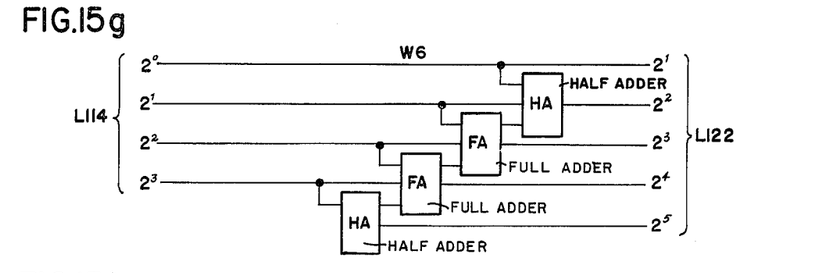
Figure 15H:
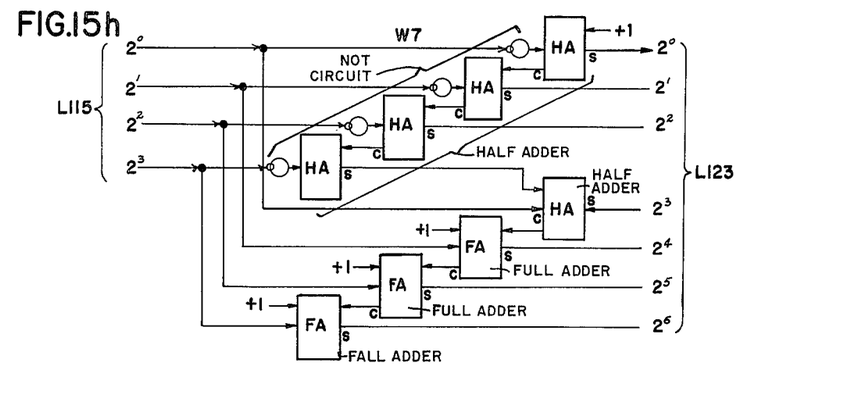
Figure 15I:
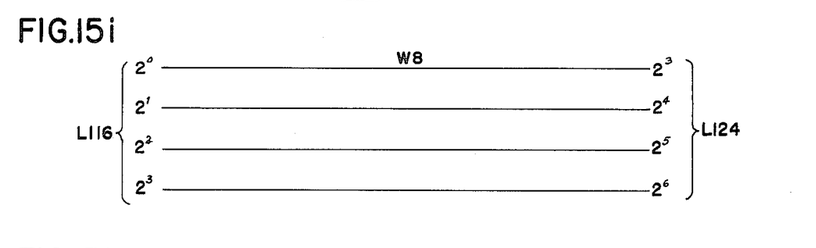

The output of counters SC1 to SC8 is then applied to the 8 weighting circuits W1 to W8 respectively. These circuits perform the function of multiplying their inputs by the number 1 up to 8, respectively. In the case of the example listed above, therefore, a "0" output signal is applied from counter SC2 to weighting circuit W2, from SC5 to W5, from SC6 to W6, from SC7 to W7 and from SC8 to W8, because these cumulative counters are supplied no input signals from any of the timing counters. Meanwhile, counter SC1 provides a "1" output (corresponding to the single input signal from T*im* 7) to weighting circuit W1, which multiplies it by 1 and turns it into a "1" output signal. Likewise counter SC3 provides a "2" output (corresponding to the 2 input signals from T*im* 1 and T*im* 8) to weighting circuit W3, which multiplies it by 3 and turns it into a "6" output signal, and again counter SC4 provides a "7" output (corresponding to the 7 input signals from T*im* 2, T*im* 3, T*im* 4, T*im* 5, T*im* 6, T*im* 9 and T*im* 10) to weighting circuit W4, which multiplies it by 4 and provides a "28" output signal. All these output signals are then applied to the arithmetical mean circuit SM.

Since each of the weighting circuits W1 to W8 serves the single purpose of multiplying its input by a fixed number, it is comparatively simple in composition. FIG. 15(b) to FIG. 15(i) outline the input-output relation in each bit of the weighting circuits on the binary scale. The half-adder and the full-adder used in these circuits are illustrated in FIG. 15(j) and FIG. 15(k), respectively. Referring to the weighting circuit W1 in FIG. 15(b), the input of each bit is picked up as it is in its output, inasmuch as an input signal is here multiplied by 1. With weighting circuit W2, the input of the 1st bit is applied to the output of the 2nd bit and the input of the 2nd bit is applied to the output of the 3rd bit and so forth. As for W3, the input of the 1st bit is picked up in its output and at the same time the same input is added to the input of the 2nd bit, picked up in the output of the 2nd bit from the first half-adder. Again, the carry from the first half-adder is added together with the input of the 2nd bit and the input of the 3rd bit, the sum being picked up in the output of the 3rd bit and so forth. The circuitry of W4 to W8 is likewise formed in the manner as shown in FIG. 15(e) to FIG. 15(i). Weighting circuits of this kind are well known.

The arithmetical mean circuit SM, on receiving signals representing the numbers 1, 0, 6, 28, 0, 0, 0, and 0 from weighting circuits W1 to W8, respectively, adds them together and divides them by 10, thus yielding an average value 3.5. This value serves as a criterion to determine the approximate central value of the registered numbers in the timing counters. That is to say, those registered numbers belonging to the divisions with numbers which fall within a fixed range involving the average value are exclusively picked up and, by obtaining their arithmetical mean for a second time, correct frequency discrimination free from the interference of noises is carried out.

The basis for such statistical treatment, which is the gist of the present method and a feature of our invention, will be more fully explained. With the present example the arithmetical mean of the registered numbers in the timing counters is 11:4. Multiplied by 5, it yields 57, which is to be regarded as the number of sampled pulses included in 5 cycles of the input signal in question. Inasmuch as 57 corresponds to 71 if counted on the octonal scale, the frequency of the input signal is judged to be $f6$ according to the classification primarily established. But this judgment is evidently erroneous. If the registered number 6 of T*im* 7 is cancelled, the arithmetical mean becomes 12, which, multiplied by 5, gives 60, or 74 in terms of the octonal scale. From this value the frequency of the input signal is judged to be $f5$ instead of $f6$. Therefore, it is desirable that the registered number 6, which may have resulted from the interference of noises or some other causes, should be automatically cancelled if a correct signal discrimination is to be obtained. The average value calculated in the mean circuit SM, i.e., 3.5 in the present example, serves the purpose of effecting such automatic cancellation of wrong numbers. Namely, SM provides a signal representing the value 3.5 to the selector S*el* 1 via the line 125. The selector S*el* 1 performs the function of determining those cumulative counters whose numbers fall within a fixed range involving the value 3.5, e.g. 3.5 ±1, and thus SC3 and SC4 are exclusively picked up. The same signal is also applied to the translator T, which in turn selects the timing counters T*im* 1 to T*im* 6 and T*im* 8 to T*im* 10 that have registered the numbers 10 to 13 belonging to Division 3 and 4 within the range 3.5 ±1. After that the selected numbers are conveyed to the summing circuit S2, where they are totalled and amount to 108. Meanwhile, the selector S*el* 1 conveys the registered numbers in SC3 and SC4 to the summing circuit S1, which adds up the numbers and gives the sum total 9 to the dividing circuit D via the line 126. The output of S2 is likewise applied to the dividing circuit D via line L127. In this case 9 signifies the number of selected timing counters or, in other words, that of selected cycles. The dividing circuit D divides the output of S2 by that of S1 and the quotient 12 (108÷9=12), i.e. the arithmetical mean of the registered numbers in the selected timing counters, is again multiplied by a fixed number in the multiplier M. The fixed number here is 5 and equals the number of cycles required to be counted for signal discrimination. Thus the output of M representing the number 60 is applied to the translating-sorting circuit T*rl*, identifies, in the same manner as the timing counters, the frequency of the input signal according to the classification given below.

| Signal frequency type: | Registered number (octonal) in M |
|---|---|
| $f1$ | 140–150 |
| $f2$ | 125–135 |
| $f3$ | 113–121 |
| $f4$ | 103–110 |
| $f5$ | 73–100 |
| $f6$ | 64–71 |
| $f7$ | 56–61 |
| $f8$ | 50–54 |
| $f9$ | 44–47 |
| $f10$ | 40–43 |

Accordingly, the input signal in the present case is judged to belong to $f5$, as much as 60 corresponds to 74 on the octonal scale.

The output of T*r*1 is then applied to the output circuit OP via one of the lines L126 to L137 according to the frequency of the input signal thus recognized. As for the output circuit OP, it is of the same type as in the preceding two examples, performing the function of converting given signals into "2 out of 5" code and send them out through the output lines 0, 1, 2, 4 and 7. If an input signal does not belong to any of $f1$ to $f10$, it is picked up through the line NU.

Of the different component circuits used in the present example, the arithmetical means circuit, the summing circuits, the dividing and multiplying circuits and the selectors are of the conventional type employed in computers or other electronic equipments and they cannot be claimed as our invention. All the component circuits function in the T.D.M. system.

It will be apparent to those skilled in the art, upon studying this disclosure, that our invention permits of various other modifications and hence may be given embodiments other than particularly illustrated and described herein, without departing from the essential features of our invention and within the scope of the claims annexed hereto.

We claim:

1. In a time-division multiplex-channel transmission system, a voice-frequency signal discriminator of the multiplex time-division common to all channels comprising input means for receiving sampled voice-frequency signals through respective channels, first threshold discriminating means for recognizing the time when an incoming sampled signal has exceeded a first predetermined threshold level, second threshold discriminating means responsive to recognition by said first threshold discriminating means for picking up sampled incoming pulses exceeding a second predetermined threshold level lower than said first threshold level, pulse extracting means connected to said second threshold discriminating means for extracting a particular pulse from groups of said picked up sampled pulses exceeding the second threshold level, and counting means connected to said pulse extracting means for measuring a given parameter of extracted pulses within a fixed time period.

2. A discriminator as in claim 1, wherein said counting means include time measuring means for measuring the intervals between successive extracted pulses and responding to corresponding interval measurements of a predetermined proportion of those intervals measured.

3. In a time-division multiplex-channel transmission system, a voice-frequency signal discriminator of the multiplex time-division type common to all channels for receiving sampled voice-frequency signals through respective channels, said discriminator comprising first threshold discriminating means for recognizing the time when an incoming sampled signal has exceeded a first predetermined threshold level, second threshold discriminating means responsive to recognition by said first threshold discriminating means for picking up sampled incoming pulses exceeding a second predetermined threshold level lower than said first threshold level, pulse extracting means connected to said second threshold discriminating means for extracting a particular pulse from groups of said picked up sampled pulses each time the incoming signal exceeds the second threshold level, and counting means connected to said pulse extracting means and having time measuring means responsive to the duration of the intervals between the extracted pulses for measuring the frequency of the sampled signal.

4. In a time-division multiplex-channel transmission system, a voice-frequency signal discriminator of the multiplex time-division type common to all channels for receiving sampled voice-frequency signals through respective channels, said discriminator comprising first threshold discriminating means for recognizing the time when an incoming sampled signal has exceeded a first predetermined threshold level, second threshold discriminating means responsive to recognition by said first threshold discriminating means for picking up sampled incoming pulses exceeding a second predetermined threshold level lower than said first threshold level, pulse extracting means connected to said second threshold discriminating means for extracting a particular pulse from said picked up sampled pulses each time the incoming signal exceeds the second threshold level, and counting means connected to said pulse extracting means and having time measuring means responsive to the statistical duration of intervals between a plurality of extracted pulses for measuring the frequency of the incoming signal.

5. In a time-division multiplex-channel transmission system, a voice-frequency signal discriminator of the multiplex time-division type common to all channels for receiving sampled voice-frequency signals through respective channels, said discriminator comprising first threshold discriminating means for recognizing the time when an incoming sampled signal has exceeded a first predetermined threshold level, second threshold discriminating means responsive to recognition by said first threshold discriminating means for picking up sampled incoming pulses exceeding a second predetermined threshold level lower than said first threshold level, pulse extracting means connected to said second threshold discriminating means for extracting a particular pulse from said picked up sampled pulses each time the incoming signal exceeds the second threshold level, and counting means connected to said pulse extracting means for responding to recurrence of said extracted pulses within fixed time period so as to measure the recurrence rates of said pulses.

References Cited by the Examiner
UNITED STATES PATENTS

| | | | |
|---|---|---|---|
| 2,586,091 | 2/1952 | Rinia | 325—325 |
| 2,876,284 | 3/1959 | Harris | 179—15 |
| 2,949,503 | 8/1960 | Andrews et al. | 179—15 |
| 3,057,964 | 10/1962 | Power | 179—84 |

DAVID G. REDINBAUGH, *Primary Examiner.*

ROBERT H. ROSE, *Examiner.*